Feb. 11, 1969 C. E. CLOUD 3,426,505
MAKING INDIVIDUAL CONDIMENT PACKAGES
Original Filed Jan. 19, 1960 Sheet 5 of 5
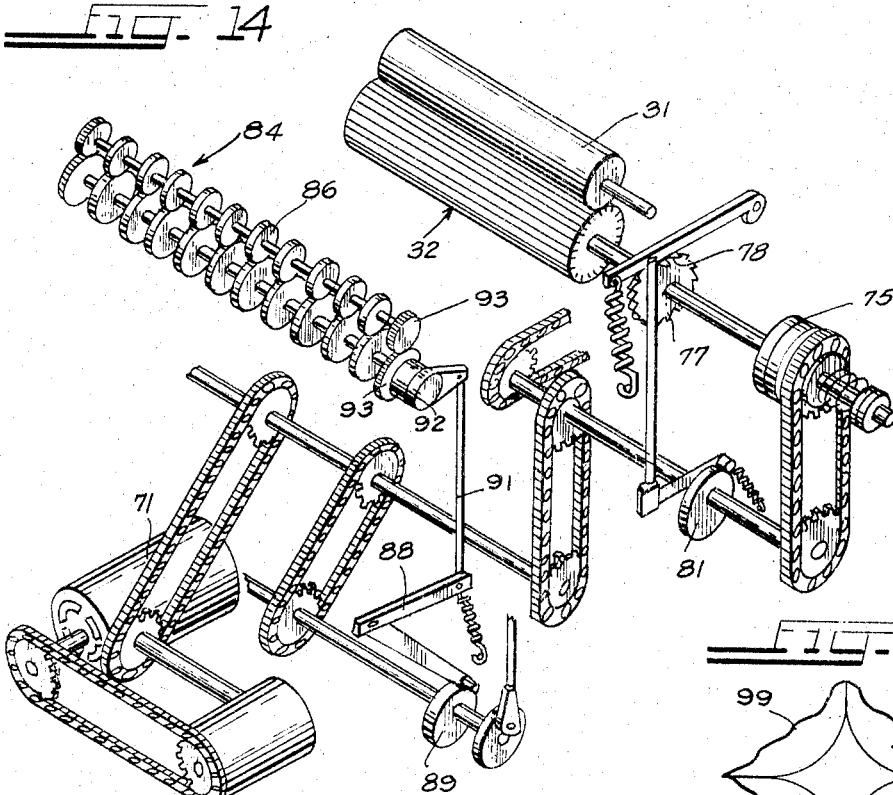
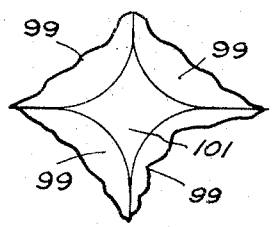
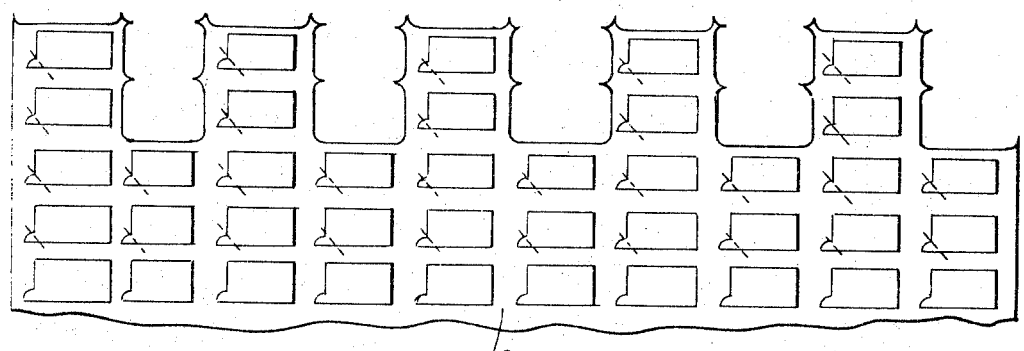
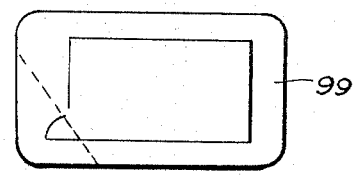
INVENTOR.
CHARLES E. CLOUD
BY Jones, Darbo & Robertson
ATTYS.

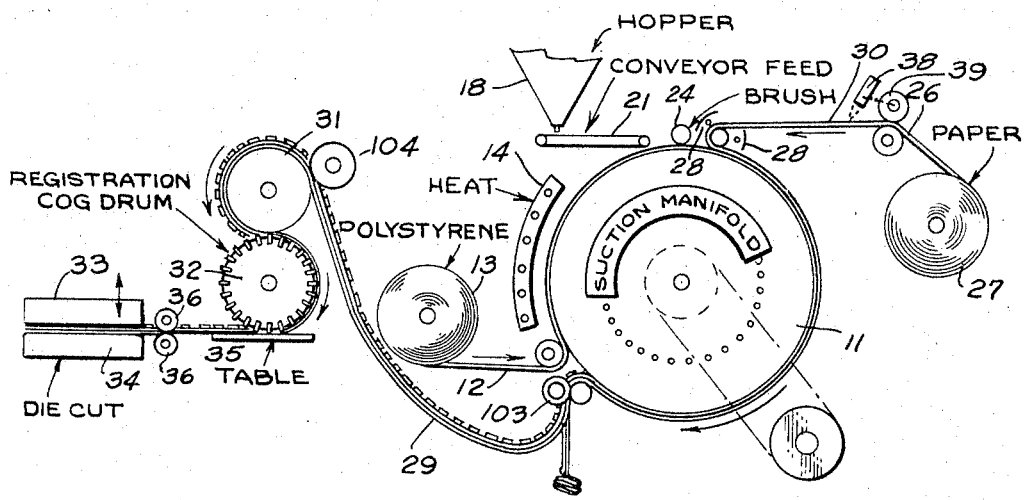
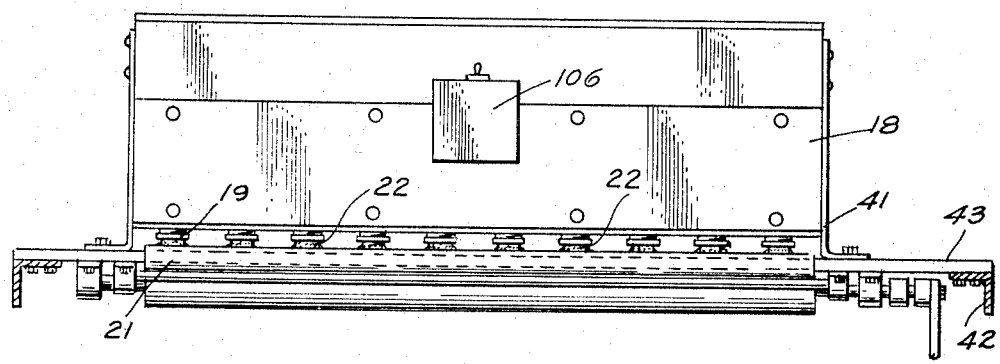

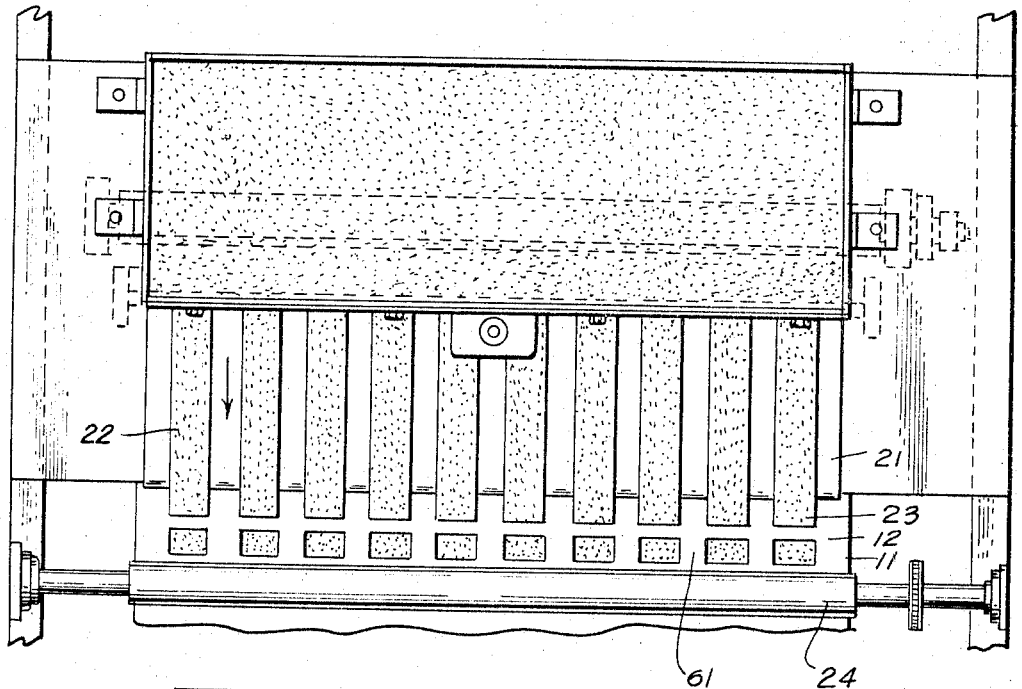
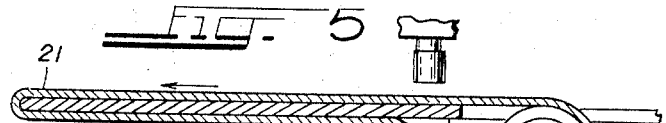
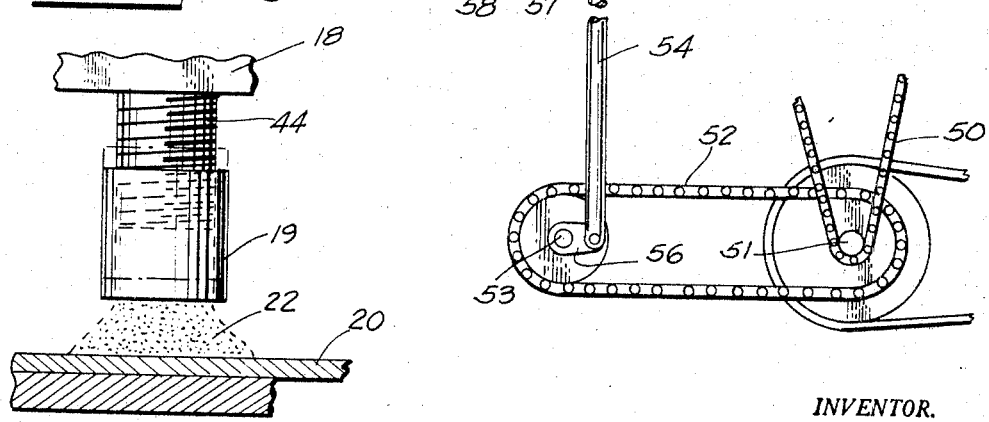

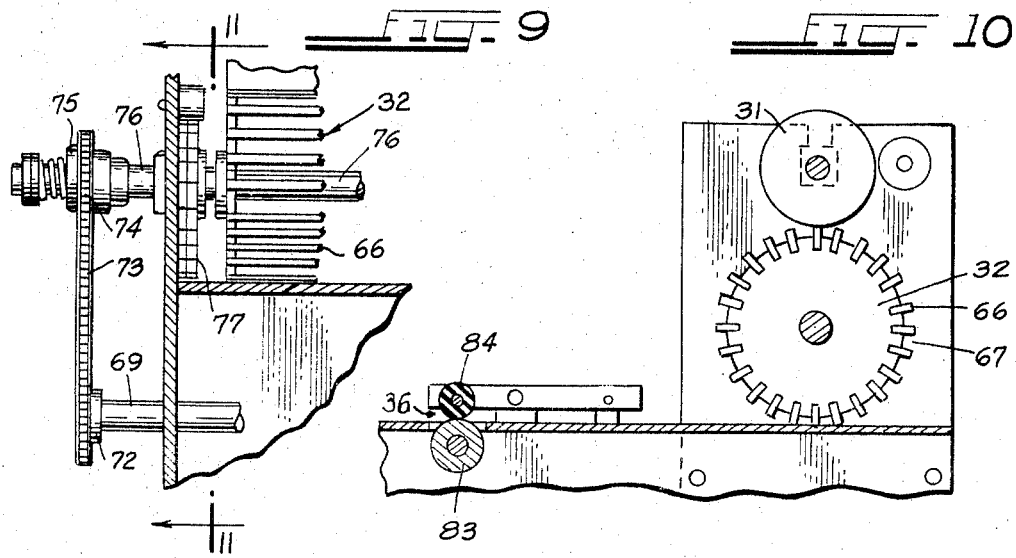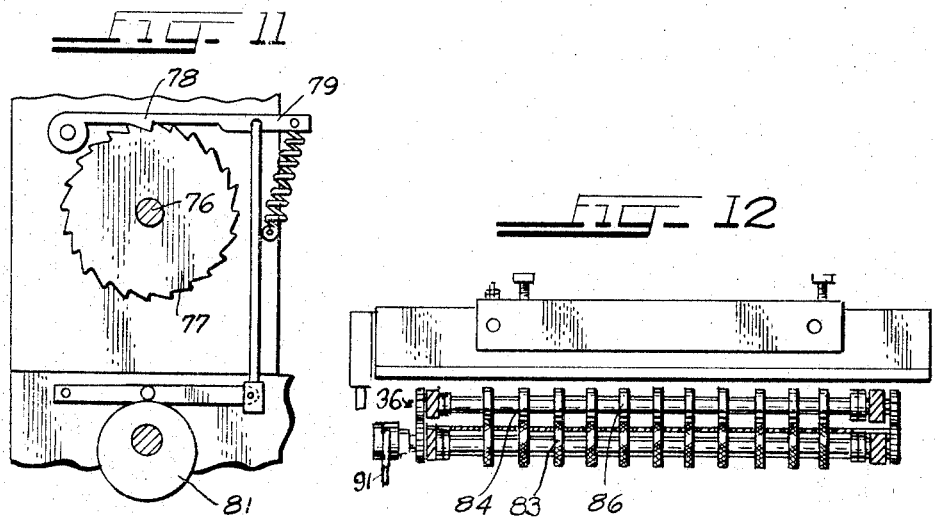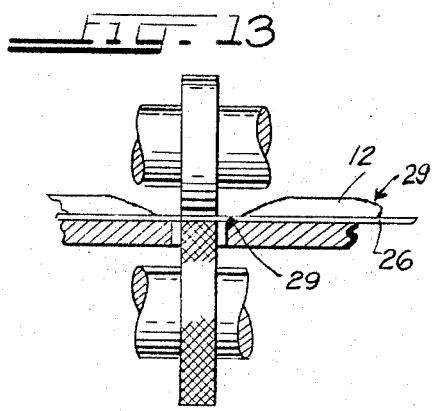

United States Patent Office 3,426,505
Patented Feb. 11, 1969

3,426,505
MAKING INDIVIDUAL CONDIMENT PACKAGES
Charles E. Cloud, 1345 Greenwood Ave.,
Wilmette, Ill. 60091
Continuation of applications Ser. No. 3,463, Jan. 19, 1960, and Ser. No. 412,880, Nov. 16, 1964. This application Nov. 15, 1965, Ser. No. 510,444
U.S. Cl. 53—184        8 Claims
Int. Cl. B65b 1/02, 1/04; B26d 5/42

ABSTRACT OF THE DISCLOSURE

A continuous web having small preformed bulging packages, supplied freely (independent of registration) is registered with respect to a cut-off device by passing around a cog drum which feeds it by forward thrust against the bulging packages. The cog drum is stopped for each cutting operation, with the position of its cog bars (and hence registration between the cutter and the packages) determined by engagement of a stop pawl with a tooth on a ratchet toothed wheel rotating with the cog drum and having one tooth for each cog. Means for forming the packages in the web is also disclosed, the web drooping between that means and the cog drum.

---

This application is a continuation of Ser. No. 3,463, filed Jan. 19, 1960, now abandoned, and of Ser. No. 412,880 filed Nov. 16, 1964, now abandoned.

There is a large and growing demand for individual condiment packages of the type in which the top can be broken open and the package used as a shaker to shake the salt or pepper on the food. Heretofore large quantities of these individual shaker packages have been made of paper, at least one side being corrugated to hold the condiment in the separate tubes formed by the corrugations. It has been evident for a long time that in spite of the present low cost of the paper packages, substantial money could be saved with a simpler package, preferably formed at least in part of a stretchable plastic film. According to the present invention, a method and suitable apparatus are provided for the economical and reliable production of these individual packages.

The style of package to be produced according to the present invention is one illustrated in the October 1958 Modern Packaging. A flat paper backing is sealed along or near its edges to a "blister" or stretch-formed face, the salt or pepper being in the chamber formed between the two layers. The plastic layer or blister has a tiny pour spout formed on it to be broken open for pouring or shaking. A score mark across the spout and the adjacent corner of the sealed portions facilitates the breaking of the spout.

As disclosed in the Modern Packaging article, this package is formed by passing the plastic film along a drum having many (for example, 1000) shallow cavities in it, heating the film to make it plastic, drawing it into the cavities by suction, placing an accurately measured "fill" of salt in each recess thus formed in the plastic, and sealing a continuous web of lacquer-coated paper to the plastic between and surrounding the recesses.

Although the article mentioned optimistically gave the impression of adequate production, the work was still experimental and problems remained to be solved. In the course of this invention, these problems have been overcome. They are related to economy in manufacture. In producing these packages by the millions, it is highly desirable to use wide webs of the plastic film and paper so that thus there will be a multiplicity of recesses in the plastic as by using a drum having a succession of perhaps 100 closely spaced rows of cavities each row having, say 10, cavities therein, the spacing of the cavities being appropriate for cutting apart without wastage.

One of the problems was to provide an accurately measured fill in these numerous cavities and at the same time present to the approaching paper clean sealing surfaces surrounding the filled recesses. This problem has been solved by the combination of a multi-spouted hopper and a conveyor belt so arranged as to apply to the belt moving under its spouts a number of parallel windrows of the salt or pepper. Each of these windrows moves in alignment with one line of recesses. The conveyor is actuated by steps in timed relation to the drum and dumps a given length of windrow into each recess. This alone accomplishes a fairly clean filling operation, but a few grains of salt or pepper find their way onto the sealing surfaces. It has been found, however, that these can be cleaned off quite satisfactorily with a proper rotary wiper.

The cutting apart of the individual packages also presented some problems. This was aggravated by the fact that rounded corners were desired so that die cutting was dictated, as contrasted to slitting and then severing the strips. Die cutting tends to require stopping the web while the dies cut, and this presented the problem of accurately stopping the web in registration with the dies. Registration of the packages with respect to the dies is accomplished by a cog drum which fits the package-formed web much as a cogwheel or sprocket fits a chain, thereby ensuring accurate positioning of the web with respect to the drum. As the dies close in their cutting strokes, the cog drum is momentarily stopped with its cogs or ribs always in the same position, to stop the movement of the web in the correct position for registration with the dies.

Additional objects and advantages of the invention will be apparent from the following description and from the drawings.

Designation of figures

FIG. 1 is a diagrammatic view of the apparatus chosen for illustration of the invention.

FIG. 2 is a fragmentary side view, partly broken away to a sectional view, of the parts of the apparatus indicated in FIG. 1 at the filling position.

FIG. 3 is a view of the filling unit shown in FIG. 1, as seen from the side shown at the right in FIG. 1.

FIG. 4 is a plan view of the portions of the apparatus shown in FIG. 2.

FIG. 5 is a fragmentary view on an enlarged scale showing especially the intermittent drive for the belt shown in FIG. 2.

FIG. 6 is a fragmentary view on a still larger scale showing especially the adjustable spout for controlling the amount of salt laid on the conveyor per inch of its movement.

FIG. 9 is a fragmentary view of sectional nature taken approximately along the line 9—9 of FIG. 8.

FIG. 10 is a fragmentary sectional view taken approximately along the line 10–10 of FIG. 8.

FIG. 11 is a fragmentary sectional view taken approximately along the line 11–11 of FIG. 9.

FIG. 12 is a fragmentary sectional view taken approximately along the line 12—12 of FIG. 8 showing especially the sets of driven rollers which constantly urge the web toward the die cutter.

FIG. 13 is a fragmentary sectional view showing one pair of cooperating feed rollers.

FIG. 14 is a somewhat diagrammatic perspective view showing the drive means for the feed rollers and the registration device.

FIG. 15 shows the appearance of the face of the web after one stroke of the die.

FIG. 16 shows a fragment of the web and the lines of cutting therefrom by the dies, although the lines shown in this view are not cut all at the same time.

FIG. 17 is a face view of a completed package.

General description

Figure 7:
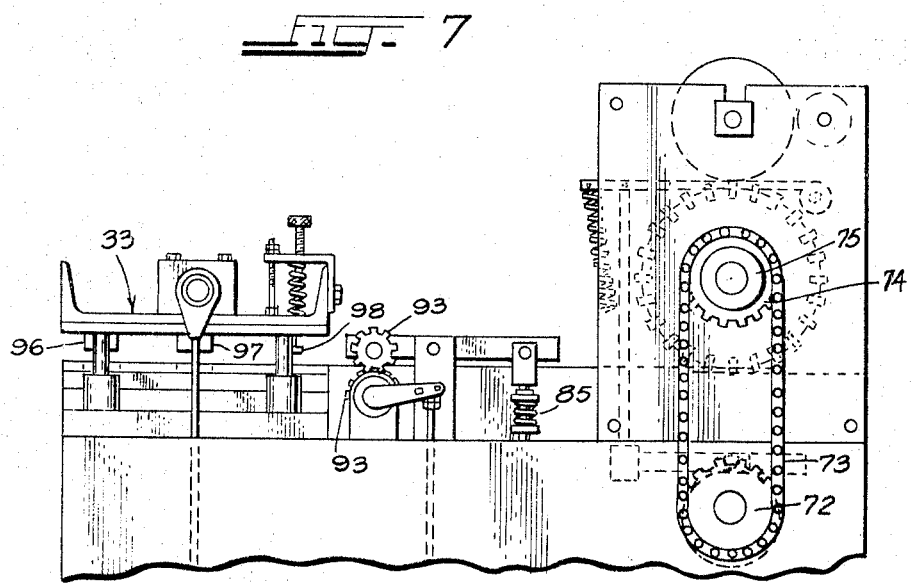
FIG. 7 is a side view of the die cutting and registering portions of the apparatus represented at the left-hand side of FIG. 1.
Figure 8:
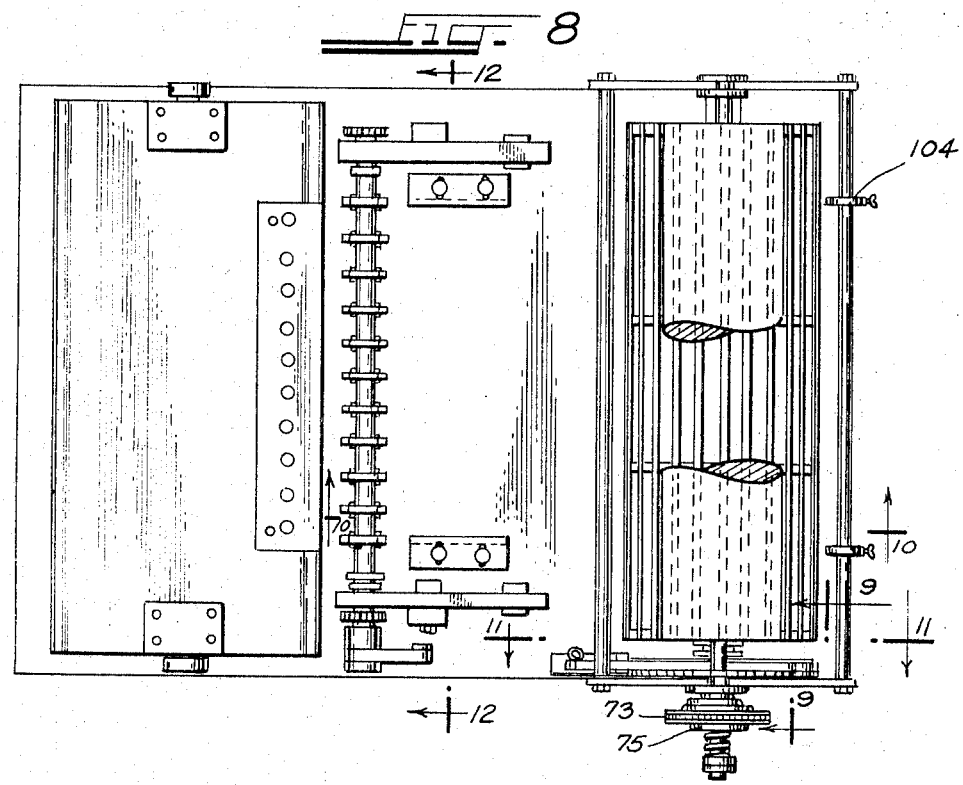
FIG. 8 is a plan view of the portion of the apparatus shown in FIG. 7, partly broken away.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

As seen best in FIG. 1, a drum 11 is driven in a clockwise direction and draws a web 12 of polystyrene film from a roll 13. This is a thick film, perhaps better called a sheet. This sheet passes under a heater 14, preferably of the radiant type, which softens the sheet. The sheet is then drawn by suction applied through a vacuum header 16 bearing the legend "Suction Manifold" into cavities too shallow to be represented in FIG. 1, thus forming the recesses, commonly called blisters, to be filled.

A supply of the material with which the packages are to be filled is maintained in a hopper 18. This hopper is provided with a line of spouts 19 under which a conveyor belt 21 runs, so that the belt 21 receives a line or windrow 22 of the fill material as best seen in FIG. 2. Preferably the belt 21 does not move constantly, but is moved intermittently, moving only when a cavity 23 is positioned to receive the fill material which will be dumped over the end of the conveyor by the movement of the conveyor.

Any fill material which does not stay in the cavities is brushed away by a rotating brush 24 so as to clean the surfaces between the cavities to receive in sealing engagement therewith a web of paper 26 drawn from a roll 27. This paper is lacquer-coated or otherwise suitable on the surface applied to the web 12 to seal to it, at least under the influence of heat. Heat sealing is accomplished by heaters 28, preferably radiant. In the illustrated form these preheat the guide roll 30 and heat the paper 26 just as it is about to engage the sheet 12.

From the drum 11 (after edge trimming described below) the combined web 29 runs around a guide roll 31 and then around a registration roll 32. This registration roll 32 may appropriately be called a cog drum. It is provided with transversely extending cogs or raised bars which fit fairly close within the spaces between the packages so as to induce accurate registration between the packages and the cog drum. This cog drum 32 is driven and stopped intermittently, the successive movements each being the overall length of the finished packages. Each time the stopping of the cog drum 32 stops the movement of the web, a movable die block 33 moves into cooperation with stationary die block 34 to cut the finished packages from the web. Feed rollers 36 may grip the web lightly enough to slip on the web when the web is held from forward movement. The feed rollers 36 also engage the spaces lengthwise of the web between the lines of blisters. Edge guides 35 ensure accurate lateral registration of the web as it enters the dies.

Although there is sufficient slack in the web 29 between drum 11 and feed roll 31 to permit the intermittent movement at drums 31 and 32 without straining on the web when drum 11 rotates continuously, the two may nevertheless move at equal speeds in packages per minute so that the amount of slack remains substantially constant. In practice, it has been found practicable to let slack pile up under edge trimmer rolls 103, so that drum 11 need not be driven in direct correlation to cog drum 32.

Registration of printing on paper web 26 with the blisters is preferably provided by an electric eye 38 and eye-controlled brake 39 which stretches the web 26 minutely as required. The eye 38 operates in timed relation to the passage of cavities in drum 11.

Measure-filling apparatus

A form of measuring and filling apparatus which has been found to be exceptionally satisfactory is as shown in FIGS. 2 to 6. The hopper 18 is carried by brackets 41 which in turn are supported by main frame 42 either directly, or, as illustrated, by table 43. The hopper 18 is provided with spouts 19 which, as seen best in FIG. 3, are arranged in a line extending transversely of feed belt 21. As the feed belt moves under the nozzles 19, each nozzle deposits on the feed belt a windrow 22 so that, as seen best in FIG. 4, there is produced a plurality of parallel windrows. Each windrow is aligned with a line of blisters 23 in the sheet 12 carried by the drum 11.

The depth of the material in each windrow 22 is determined by adjustability of the spouts 19, as seen best in FIG. 6. For example, each spout 19 may be threaded to a coupler 44, which may be said to form the body of the spout, extending down from hopper 18. By screwing the spout 19 up or down on coupler 44, its height above belt 21 is adjusted. The height of windrow 22 necessarily determines the amount of fill material which is in each inch of length of windrow 22. Accordingly, if the feed belt 21 is moved a given distance each time one of the pockets 23 is located under its discharge end, it will dump the same amount of fill into each of the pockets 23 in succession. The dumping of the fill material from the belt 21 can be confined to periods when a row of pockets 23 is positioned to receive the fill, by actuating the belt 21 to move intermittently in timed relation with the drum 11. This may be accomplished, for example, as seen in FIG. 5. Drive shaft 51 is a driven shaft which drives drum 11, through means maintaining a constant relation to it, as through timing belt 50. Through a chain 52 it drives shaft 53 one revolution for each passage of a row of pockets 23 past a given point. Thus for each such movement there is a reciprocation up and down of connecting rod 54 which is driven by crank 56. Connecting rod 54 oscillates lever 57 which is connected to drive pulley 58 through a one-way drive device.

It is desirable to lay a relatively flat-topped fill in each pocket. This is approached merely by having the belt 21 feed during substantially the full time the continuously moving pocket is in receiving position. It is further achieved by having the depth of pockets gradually reduced toward the sides (see FIG. 13) and adjusting the spouts 19 (shown too high in FIG. 6) to provide a windrow of correspondingly varying depth, transversely.

Clean-off roll

Slightly beyond the filling point, brush or clean-off roll 24 is driven in a direction to sweep backwards along the film 12 any loose material on its sealing surfaces 61 surrounding each of the pockets 23. The brush 24 may not appear to be a brush in the ordinary sense. It is, however, a brush in the sense of brushing back the grains of fill which are not in the pockets. It also levels off the fill in the pockets to the depth in the pockets reached by brush 24. The surface of the brush 24 is preferably accurately cylindrical, as by being a closely clipped (such as ⅛") nap of mohair fibers closley packed as in rug making. The material is readily available on the markets, being a material of which high grade paint applying rollers are made. Although other materials could no doubt be used with a moderate degree of success, this brush has been found to be exceptionally effective. It is deemed important to have a closely packed surface of individually resilient brush elements such as bristles or fibrous strands.

Close spacing of these elements at the surface of the roll requires that they be short as otherwise they would be too crowded where they are secured.

Registration for die cutting

The main elements for obtaining registration with respect to the operation-performing means comprising the dies which sever the packages from the web as shown in FIGS. 9 to 13. FIG. 10 perhaps best shows the characteristic form of the cog drum in which it has a plurality of bars 66 spaced equally around the circumference of the drum and having spaces 67 between them into which the rows of blisters may fit. As indicated in FIG. 1 the package-formed web 29 extends around upper idle guide drum 31 so that it is wrapped snugly around a substantial portion of the periphery of cog drum 32, thus keeping the blisters in step with the cogs. Although experience might prove that cog drum 32 could be constructed of such light weight and mounted with such low friction that driving it would not be necessary, it is at present preferred that it be friction driven. Thus a shaft 69 which may be constantly driven with the other parts of the machine by a motor 71 (FIG. 14) which drives a sprocket 72, which in turn drives a chain 73 and sprocket 74 which is part of a friction drive unit 75 which constantly tends to turn shaft 76 but permits sprocket 74 to turn whether shaft 76 turns or not. Drum 32 is fast on shaft 76.

Shaft 76 also carries a ratchet-toothed wheel 77, seen best in FIG. 11. This wheel is periodically engaged by stopping pawl 78 carried by lever 79 which is operated by cam 81 by details sufficiently shown in FIG. 11. Thus when the cam 81 allows the lever 79 to drop, pawl or dog 78 stops ratchet-toothed wheel 77 always with one of its teeth accurately positioned. Ratchet wheel 77 has the same number of teeth as there are cog bars 66. Hence the cog bars, collectively speaking, always stop at the same position. Perhaps it would be expressed more accurately to state that there is a position at which some one of the cog bars invariably is accurately stopped each time the pawl 78 comes into play. In this manner the longitudinal position at which the blisters stop for operation of the cutoff dies is accurately determined. From FIG. 7, it is seen that the cut-off die 33 cuts the web at a position uniformly spaced from and in close proximity to the drum, being carried by the same frame with it, so that accurate stopping of the web with respect to the position of its blisters or bulges will cause uniform positioning (registration) of the cuts as to the blisters. The friction drive device 75 ensures a fast start of the drum 32 when the pawl 78 is raised, and is the main means for feeding the web.

Proper feeding of the web into the die area is facilitated by feed roll 83 and pressure roll 84, both driven. The pressure of pressure roll 84, controlled by adjustable springs 85, is light enough so that the rolls may be driven more than enough to accomplish the feed of the web, and just slip on the web when the web is restrained by registration cog drum 32. It is nevertheless firm enough to help advance the web quickly. As best seen in FIG. 12, the pressure roller 84 is made up of a plurality of individual narrow rollers 86. These are of a width and spacing to grip the web between the blisters of one transverse roll. As seen in FIG. 14, the preferred form of drive of feed roll 83 is intermittent. A bell crank lever 88 is actuated by cam 89 and through connecting rod 91 oscillates lever 92 which has a one-way drive connection with the shaft of roll 83. Gears 93 have been shown for driving the shaft of pressure roll 84, although it might prove unnecessary to have both of these rolls driven.

The cams 81 and 89 are driven in one to one relationship, and are so disposed that the rolls 83 and 84 are driven while the stop pawl 78 is raised to permit cog drum 32 to be driven through the friction drive device 75.

The movable assembly 33 of the die cuting apparatus carries longitudinally separated rows of dies 96 and 97, as well as a row of scoring blades 98. The resulting condition of the end of the web is shown in FIG. 15. The only scrap, except possibly at the edges of the web, will be that formed in providing rounded corners for the finished package shown in FIG. 17. Thus as indicated in FIG. 16, the lines forming the edges of four packages 99 coincide for adjacent packages except along the periphery of a small slug 101 forming the only necessary scrap, although the illustrated form includes shearing rollers 103 of FIG. 1 which trim off a quarter inch or so.

Lateral registration

Extremely accurate lateral registration is obtained in the illustrated form of the invention. The plastic sheeting and the paper sheeting are both guided onto drum 11 by the positioning of drums 13 and 27.

The shearing rollers 103 of FIG. 1 trim the two edges of the combined web to provide just the width which can be cut by the dies without further edge trimming (except at the rounded corners), and to center the printed pattern and blisters within this width. The combined web 29 is guided onto roll 31 by guides 104. And finally adjustable edge guides 35 control the lateral position of the web accurately as it enters the die cutting area.

For pepper, or any other material not dependably free flowing, a vibrator 106 can be mounted on hopper 18.

The fetaures here described have combined to provide a very satisfactory, dependable, and economically operated apparatus suitable for forming by the millions individual portion packages such as are now widely used for salt and for pepper. For economical production, a relatively high operating speed is desired. The limiting factors were the filling and the die cutting, but the present invention provides satisfactory speed and accuracy at both points. At the filling position, the filling device can reciprocate at a fairly good frequency and still measure with sufficient accuracy. At the die cutting position, accurate registration is ensured by the accurate stopping of the cog drum, and speed is achieved by driving the cog drum and simultaneously driving separate feed rollers directly engaging the web.

The broad claims, as did those of the parent appplications, cover forms of the invention not illustrated. These other forms are not to be claimed specifically because, though not disclosed in the parent applications, at least one was in public use more than a year before the present application. In such later forms the results of this application are achieved with different means of registrationally correlating the drum and the device operating on the web. More specifically, in one form the drum is stopped by using a stepping drive means (a cam device analogous to a Geneva mechanism) which stops the drum with permanent or enduring accuracy of positional correlation.

I claim:

1. Apparatus for performing a registered operation on a web having uniformly spaced bulging pockets therein which includes a rotatable drum having raised portions separating recesses adapted to receive the bulged pockets, drum-controlling means, including driving means, for actuating the drum consistently as predetermined by the design of the drum-controlling means, means for supplying a web having preformed bulging pockets therein, and guiding it past the drum with the bulged pockets extending into the recesses, operation-performing means correlated with the drum for operating at predetermined points on the web uniformly spaced from and in close proximity to the drum, said drum and drum controlling means comprising means bringing the web consistently and indefinitely into accurate registration of its bulged pockets with said operation-performing means by the drawing of the web past the drum by forward pressure of the raised portions of the drum against the pockets of the web, the means supplying the web being incapable, independently of said drum, of maintaining the movement of the web in accurate registration with the operation of the operation-performing means, so that the consistent registration of the operation-performing means with respect to the bulged pockets is determined by, and dependent upon the registering action of the drum.

2. Apparatus for performing a registered operation on a web having uniformly spaced bulging pockets therein which includes a rotatable drum having raised portions separating recesses adapted to receive the bulged pockets, drum-controlling means, including driving means, for actuating the drum consistently as predetermined by the design of the drum-controlling means, means for supplying a web having preformed bulging pockets therein, and guiding it past the drum with the bulged pockets extending into the recesses, operation-performing means correlated with the drum for operating at predetermined points on the web uniformly spaced from and in close proximity to the drum, said drum and drum controlling means comprising means bringing the web consistently and indefinitely into accurate registration of its bulged pockets with said operation-performing means by the drawing of the web past the drum by forward pressure of the raised portions of the drum against the pockets of the web, the means supplying the web being incapable, independently of said drum, of maintaining the movement of the web in accurate registration with the operation of the operation-performing means, so that the consistent registration of the operation-performing means with respect to the bulged pockets is determined by, and dependent upon the registering action of the drum;

said drum-controlling means comprising two positioning means which by contact with one another while one has a durable positional correlation with the raised portions collectively, collectively position said portions consistently and for an indefinite time, one of said positioning means having an endless series of members each having a positioning surface facing generally along a path of movement.

3. Apparatus for performing a registered operation on a web having uniformly spaced bulging pockets therein which includes a rotatable drum having raised portions separating recesses adapted to receive the bulged pockets, drum-controlling means, including driving means, for actuating the drum consistently as predetermined by the design of the drum-controlling means, means for supplying a web having preformed bulging pockets therein, and guiding it past the drum with the bulged pockets extending into the recesses, operation-performing means correlated with the drum for operating at predetermined points on the web uniformly spaced from and in close proximity to the drum, said drum and drum controlling means comprising means bringing the web consistently and indefinitely into accurate registration of its bulged pockets with said operation-performing means by the drawing of the web past the drum by forward pressure of the raised portions of the drum against the pockets of the web, the means supplying the web being incapable, independently of said drum, of maintaining the movement of the web in accurate registration with the operation of the operation-performing means, so that the consistent registration of the operation-performing means with respect to the bulged pockets is determined by, and dependent upon the registering action of the drum;

said drum-controlling means including two coacting positioning means, one of which includes an endless series of members each having a surface facing generally along a path of motion, one of said positioning means being permanently positionally correlated with the raised portions collectively, and the other being permanently positioned for so positioning the said surfaces and through them the raised portions by contact between the two positioning means at the time of stopping that the raised portions are collectively stopped in the same position consistently and indefinitely.

4. Apparatus for performing a registered operation on a web having uniformly spaced bulging pockets therein which includes a rotatable drum having raised portions separating recesses adapted to receive the bulged pockets, drum-controlling means, including driving means, for actuating the drum consistently as predetermined by the design of the drum-controlling means, means for supplying a web having preformed bulging pockets therein, and guiding it past the drum with the bulged pockets extending into the recesses, operation-performing means correlated with the drum for operating at predetermined points on the web uniformly spaced from and in close proximity to the drum, said drum and drum controlling means comprising means bringing the web consistently and indefinitely into accurate registration of its bulged pockets with said operation-performing means by the drawing of the web past the drum by forward pressure of the raised portions of the drum against the pockets of the web, the means supplying the web being incapable, independently of said drum, of maintaining the movement of the web in accurate registration with the operation of the operation-performing means, so that the consistent registration of the operation-performing means with respect to the bulged pockets is determined by, and dependent upon the registering action of the drum;

said drum-controlling means including means stopping the drum including means for yieldably driving the drum and means for stopping the drum including a dog and said apparatus including an endless series of members cooperating with the dog and each having a surface facing generally along the path of motion, said dog and cooperating members comprising two coacting positioning means, one of which has a permanent positional correlation with the raised portions collectively, and the other of which is permanently positioned, for its position at the time of contact between one of said surfaces and said dog, for uniformly, and indefinitely positioning the raised portions collectively in the same position for registration of the sheet material moved thereby with the operation-performing means.

5. Apparatus for performing a registered operation on a web having uniformly spaced bulging pockets therein which includes a rotatable drum having raised portions separating recesses adapted to receive the bulged pockets, drum-controlling means, including driving means, for actuating the drum consistently as predetermined by the design of the drum-controlling means, means for supplying a web having preformed bulging pockets therein, and guiding it past the drum with the bulged pockets extending into the recesses, operation-performing means correlated with the drum for operating at predetermined points on the web uniformly spaced from and in close proximity to the drum, said drum and drum controlling means comprising means bringing the web consistently and indefinitely into accurate registration of its bulged pockets with said operation-performing means by the drawing of the web past the drum by forward pressure of the raised portions of the drum against the pockets of the web, the means supplying the web being incapable, independently of said drum, of maintaining the movement of the web in accurate registration with the operation of the operation-performing means, so that the consistent registration of the operation-performing means with respect to the bulged pockets is determined by, and dependent upon the registering action of the drum;

said drum driving and controlling means including means for yieldably driving the drum and means for stopping the drum comprising a rotating ratchet wheel directly coupled to the drum, periodically stopped by a pawl mechanism, and having teeth in a number bearing such relation to the number of raised portions of the drum that each rotational increment of the ratchet wheel between stops will rotate the drum an equal increment and stop the drum with the raised portions collectively in the same position.

6. Apparatus for performing a registered operation on a web having uniformly spaced bulging pockets therein which includes a rotatable drum having raised portions separating recesses adapted to receive the bulged pockets, drum-controlling means, including driving means, for actuating the drum consistently as predetermined by the design of the drum-controlling means, means for supplying a web having preformed bulging pockets therein, and guiding it past the drum with the bulged pockets extending into the recesses, operation-performing means correlated with the drum for operating at predetermined points on the web uniformly spaced from and in close proximity to the drum, said drum and drum controlling means comprising means bringing the web consistently and indefinitely into accurate registration of its bulged pockets with said operation-performing means by the drawing of the web past the drum by forward pressure of the raised portions of the drum against the pockets of the web, the means supplying the web being incapable, independently of said drum, of maintaining the movement of the web in accurate registration with the operation of the operation-performing means, so that the consistent registration of the operation-performing means with respect to the bulged pockets is determined by, and dependent upon the registering action of the drum;
   said means for supplying a web being substantially spaced from the drum to provide a drooping length of web between said means and said drum.

7. The method of operating
   apparatus including a rotatable drum having raised portions separating recesses adapted to receive uniformly spaced bulging pockets of a web, drum-controlling means, including driving means, for actuating the drum consistently as predetermined by the design of the drum-controlling means, operation-performing means correlated with the drum for operating at predetermined points on the web uniformly spaced from and in close proximity to the drum, said drum and drum controlling means comprising means bringing the web consistently and indefinitely into accurate registration of its bulged pockets with said operation-performing means by the drawing of the web past the drum by forward pressure of the raised portions of the drum against the pockets of the web comprising the steps of
supplying a web having therein uniformly spaced bulging pockets to said apparatus independently of any longitudinal registration with respect thereto other than that achieved by said apparatus and,
by controlled movement of the drum according to the design of the drum-controlling means maintaining the movement of the web in accurate registration, as to its bulging pockets, with respect to the operation of the operation-performing means, so that the consistent registration of the operation-performing means with respect to the bulged pockets is determined by, and dependent upon the registering action of the drum.

8. Apparatus for forming filled packages including a drum carrying a multiplicity of cavities on its peripheral surface, means for rotating the drum, means for holding a roll of heat stretchable sheet material to be drawn around the drum past a filling position near the top of the drum, heating means along the path of the sheet in advance of the filling position to heat the sheet, suction means associated with the drum for sucking the heated sheet material into the cavities to form pockets in the sheet, means for holding a roll of sheet backing material and feeding it to the drum rearwardly of the filling position to seal the pockets by being sealed to the pocketed sheet between the pockets therein to form a combined web, said last named means including means for producing registration between printed matter of said backing material and the recesses of the drum; a cog drum engaging the side of the combined web comprising the pocketed sheet and having cog bars fitting between successive pockets to ensure registration thereof with the cog drum, means yieldably driving the cog drum to advance the web, means for stopping the cog drum each time a cog bar reaches a given position to stop the web with its pockets always correspondingly positioned, and reciprocating means which severs sealed packages from said web as it is held in said position, said means for stopping comprising a rotating ratchet wheel directly coupled to the cog drum, periodically stopped by a pawl mechanism, and having teeth in a number bearing such relation to the number of bars of the cog drum that each rotational increment of the ratchet wheel between stops will rotate the cog drum an equal increment and stop the cog drum with the cog bars collectively in the same position.

References Cited
UNITED STATES PATENTS

| | | | |
|---|---|---|---|
| 654,964 | 7/1900 | Ferres | 83—423 |
| 3,092,940 | 6/1963 | David | 53—29 |

TRAVIS S. McGEHEE, *Primary Examiner.*

E. F. DESMOND, *Assistant Examiner.*

U.S. Cl. X.R.

83—55, 278